Figure 1:
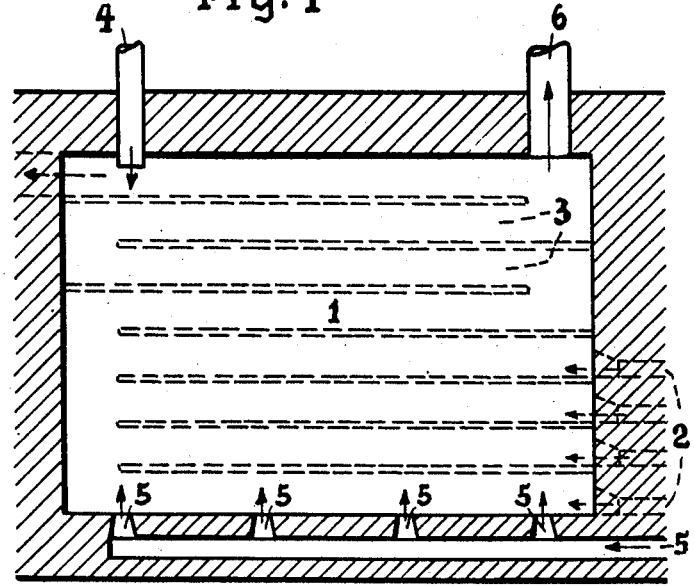

Dec. 12, 1933.   F. HERZBERG   1,939,498
PROCESS FOR GASIFYING FINELY DIVIDED SOLID AND LIQUID FUELS
Filed Dec. 16, 1930   6 Sheets-Sheet 1

Inventor,
Franz Herzberg,
by _____ Attorney.

Dec. 12, 1933. F. HERZBERG 1,939,498
PROCESS FOR GASIFYING FINELY DIVIDED SOLID AND LIQUID FUELS
Filed Dec. 16, 1930 6 Sheets-Sheet 2
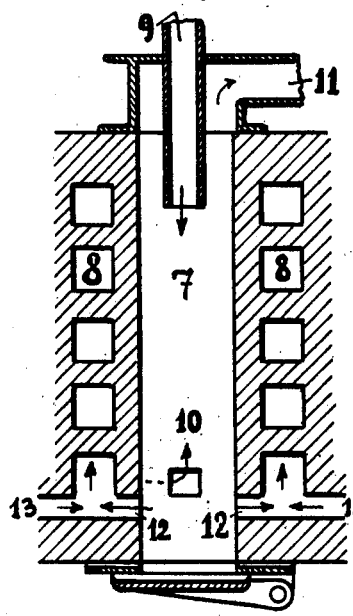
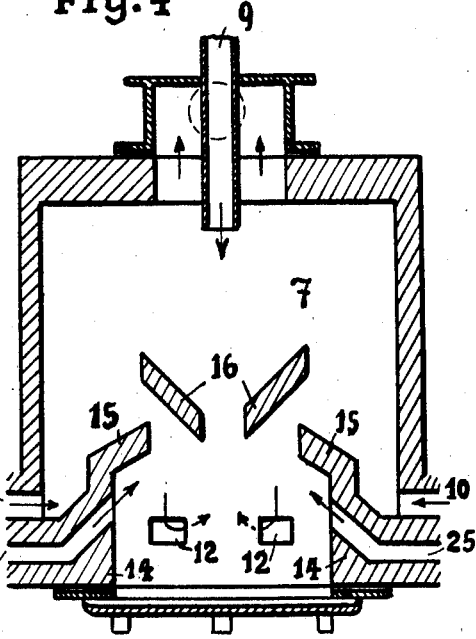
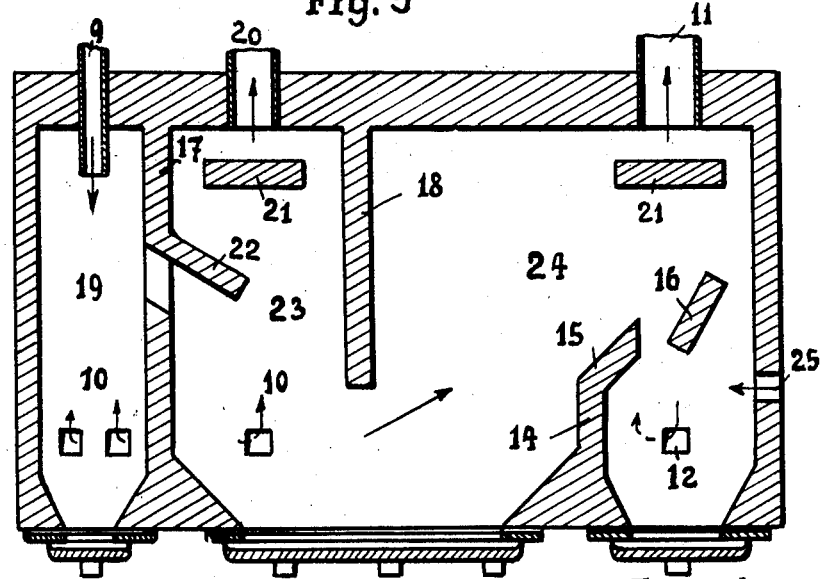
Inventor
Franz Herzberg,
by Attorney.

Dec. 12, 1933.  F. HERZBERG  1,939,498
PROCESS FOR GASIFYING FINELY DIVIDED SOLID AND LIQUID FUELS
Filed Dec. 16, 1930  6 Sheets-Sheet 3

Inventor
Franz Herzberg,
by
Attorney.

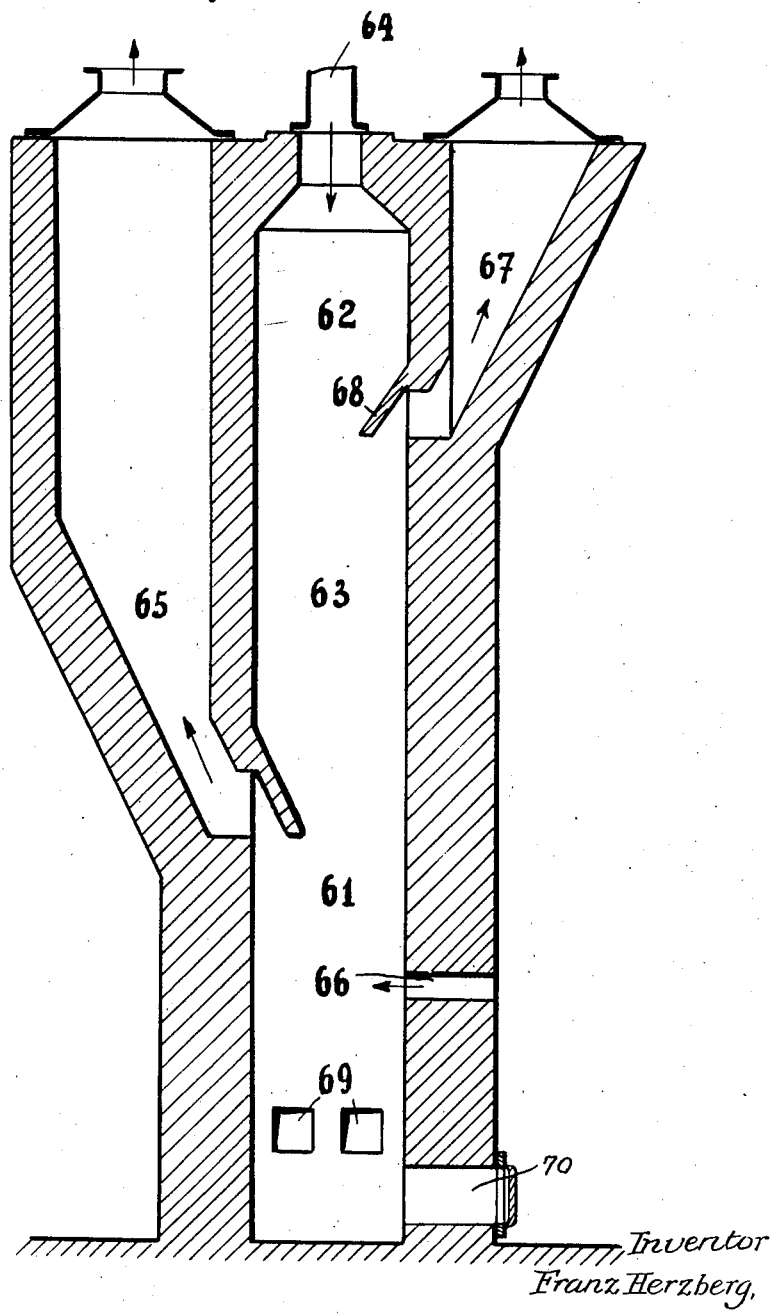

Dec. 12, 1933.   F. HERZBERG   1,939,498
PROCESS FOR GASIFYING FINELY DIVIDED SOLID AND LIQUID FUELS
Filed Dec. 16, 1930   6 Sheets-Sheet 5
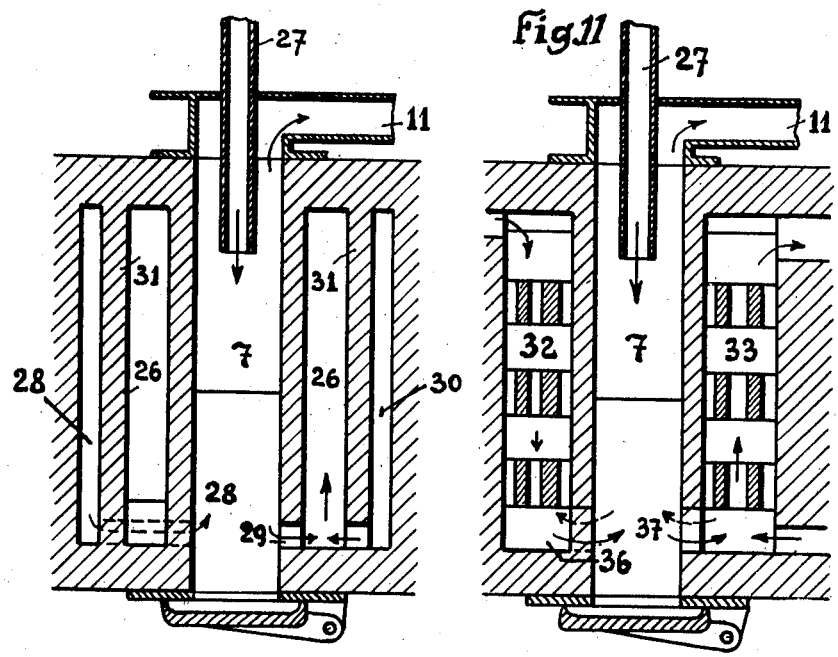
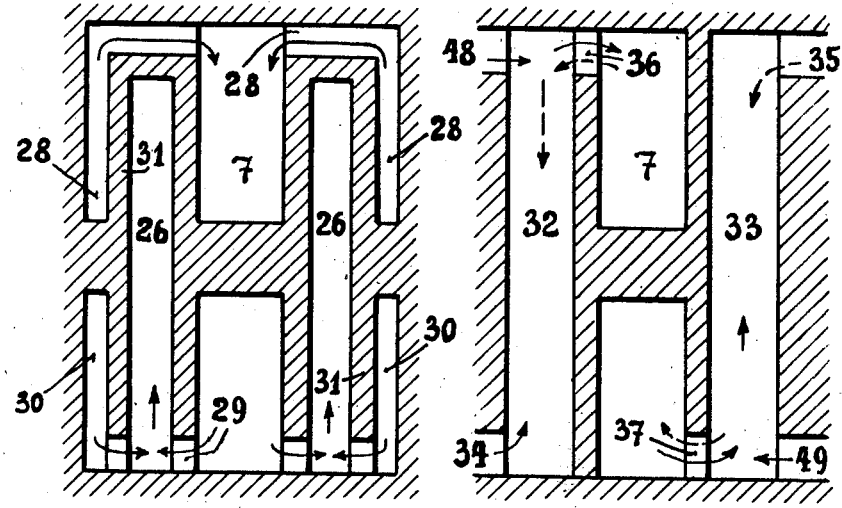
Inventor
Franz Herzberg
by
Attorney.

Dec. 12, 1933.  F. HERZBERG  1,939,498
PROCESS FOR GASIFYING FINELY DIVIDED SOLID AND LIQUID FUELS
Filed Dec. 16, 1930  6 Sheets-Sheet 6

Inventor
Franz Herzberg,
by
Attorney.

Patented Dec. 12, 1933

1,939,498

UNITED STATES PATENT OFFICE 1,939,498

PROCESS FOR GASIFYING FINELY DIVIDED SOLID AND LIQUID FUELS

Franz Herzberg, Leisnig, Germany

Application December 16, 1930, Serial No. 502,839, and in Germany February 19, 1926

11 Claims. (Cl. 48—202)

The invention relates to the production of gas from finely divided fuels, which may be in the form of dust such as bituminous coal dust or brown coal dust, or may consist of fine liquid drops, such as for example, tar, tar oils and the like. Where mention is made in the following, of fuels in the form of dust, this is to be understood as meaning both solid fuels in the form of dust and liquid fuels also in the form of spray or mist.

The unusually important problem of the gasification of finely divided fuels, and more particularly of brown coal dust, has not yet been provided with any practically useful solution, despite numerous experiments and proposals, some of which date back for decades. Even when the aim of producing a gasification product similar to illuminating gas or water gas has been abandoned, and attempts have been made merely to obtain a uniform internal heating of the retort by supplying air in the manner of the ordinary gas-producer process, success has not been achieved.

In point of fact, the conditions for the gasification of fuels in the form of dust are considerably more difficult than when lump fuels are used, in which case it is merely sufficient to carry out the coking or distillation process (that is to say, the expulsion of the very volatile constituents) at a moderate temperature, because the lump coke produced can at once be utilized, and can also be converted into water gas by alternately blowing it to incandescence and injecting steam. On the contrary, coke in the form of dust, for example, the so-called "Grudekoks" obtained from brown coal dust, has only a very narrow sphere of application. The production of water gas from coal dust or coke dust by alternately blowing it to incandescence and introducing steam is attended by considerable difficulties and has not yet been achieved in a practical manner. Thus in the case of fuels in the form of dust, there is a much more pressing need than in the case of lump fuels, for a process of continuous gas production with external heating of the gasifying chamber, in which coke or the like in the form of dust does not remain behind but in which a good gas, similar to illuminating gas or at least water gas, is obtained.

The invention provides a solution of this problem. It consists in the first place in introducing the finely divided fuel into a chamber heated externally by heating flues and of the size of the most modern coke oven chambers i. e. at least 2×6×0.45 meters for vertical chambers or 6×4×0.45 meters for horizontal chambers, and there gasifying the said fuel, and also if required partly burning it for the purpose of heating the chamber, so that the fuel is completely consumed and only ash and gas leave the oven.

As shown by practical experiments, the size of the gasifying chambers plays a decisive part in the new process. Heretofore only very small retorts have been used for gasifying dust, the said retorts being made of the size of the known horizontal retorts for the distillation of illuminating gas, or even of still smaller size, for example, so that the temperature of gasification could be increased to quite an extraordinary degree by special means, for example, by surface combustion, it has been found impossible, however to utilize the fuels in this way without residue. It is only by increasing the size of the chamber to an extraordinary degree, in combination with external heating by means of heating flues that practical results have been obtained according to the invention. It has been found, for instance, that by the use of such chambers of large volume, having a sufficient dimension in the direction of the path of the dust (at least 2 metres when the dust falls vertically) it is possible to obtain an unequalled high product of the rate of gasification multiplied by the duration of gasification, which is not possible with the small retorts heretofore employed, despite the considerably higher temperature which can be obtained with the said retorts in practice. It has even been found that, with large space chambers. this product may be increased to such an extent that the dust may be completely gasified in the suspended state with the formation of a mixed gas of mean calorific value, the problem of course being thereby solved.

However, it is also possible, according to the invention, to gasify only to such an extent that quantities of dust still remain ungasified, though more or less coked, and then to burn the same at once before they have cooled completely, in order thus to cover the heating of the chamber either entirely or at least partly. In this case also only ash and gases leave the furnace. The advantage of this process is that the useful capacity of a chamber of given size, the ratio of the quantity of gas produced to the amount of fuel expended, and finally also the durability of the chamber are considerably increased. It is just the last stage of gasification of the already coked fuel residue within the chamber which requires the greatest amount of heat and the highest temperature, and this is dispensed with in the process according to the invention. The amount of heat to be conducted through the chamber walls, and therefore the temperature of the said walls may be correspondingly reduced without diminishing the through-put of the furnace. Conversely, for the same amount of heat transmitted by the chamber walls, a considerably greater amount of gas can be obtained.

The further utilization of the residual fuel before it cools completely, improves in the first place the thermal economy of the process, but it also facilitates its ignition when used for the external heating of the chamber in the case of both direct and indirect use.

The use of large chambers affords a number of other advantages. Charging may proceed automatically, and like the temperature and quality of the gas produced, may be readily regulated, both of which operations in the case of batteries of small ovens of uniform size offer difficulties or are even impossible. The security of working and the durability of the apparatus are considerably greater, and the loss of heat by radiation (and therefore the consumption of fuel in proportion to the amount of gas produced) is considerably smaller, than with individual retorts. The utilization of the heat of the escaping combustion gases also offers only slight difficulties.

Since, as is known, elementary carbon or coke gasify even at the highest temperatures only in the presence of substances which will part with oxygen, and more particularly steam, the latter must of course be introduced into the gasifying chamber if the fuel itself contains or gives off insufficient water, which is the case not only with solid fuels, but also with very many liquid fuels (tar, tar oils). If solid coke particles are to be retained for heating the oven, the addition of steam must be restricted or must not be made at all.

If steam is to be supplied to the gasifying chamber, it is preferable to arrange the steam supplying channels so that they are directed opposite one another or are offset relatively to one another, in order to produce eddies which, by virtue of their momentum, are better able to support the dust cloud than gas which flows in quietly. It is just in the first sections of the chamber, which are intended for the generation of rich gas, that the amount of gas required for supporting the dust cloud is frequently unavailable, because the coking process sets in slowly, more particularly when this portion of the chamber is heated to a relatively low temperature. The steam added likewise acts as a supporting gas, but its effect should be promoted by the aforementioned arrangement of the supply passages, while its quantity should be limited to such an extent as to obviate a detrimental excess thereof, which would otherwise deteriorate the rich gas and would also have an unfavourable effect upon the water-gas equilibrium in the subsequent sections of the chamber.

The fuel dust entering the first part of the gasification chamber is first of all subjected to the process of distillation or coking, during which the more volatile constituents escape, with decomposition of the fuel. The temperature required therefor is comparatively low. The gas formed in this section, the so-called rich gas, contains a large proportion of hydrocarbons and consequently possesses a very high calorific value. In the subsequent sections of the chamber, on the contrary, there is formed through the long continued heating and, as a rule, through the higher temperature there prevailing, a gas of lower calorific value, called lean gas, consisting largely of hydrogen and carbon monoxide. This lean gas may be removed separately, in order thereby to increase the calorific value of the remaining gas. It is, in that case, particularly suitable for the direct heating of the chamber walls, because it is considerably more powerful than producer gas, owing to its having been produced without the addition of air, and therefore contains considerably less nitrogen and other inert gases. It is preferably burnt while still hot, that is to say, utilizing, at least partly, its sensible heat. Of course, in order to carry out such heating with lean gas uniformly and reliably, a precisely accurate regulation of the pressure in the gas channels and heating channels is necessary, which may be attained, however, by means of known regulators working to pressures of fractions of a millimetre of water.

The large chambers to be used according to the invention also permit the rich gas produced in the uppermost portion of the chamber to be drawn off separately. For this purpose, it suffices if one or more withdrawal places are arranged between the dust supply and the main gas outlet of the chamber.

It is worthy of remark that, in the substantially empty chambers for the gasification of fuels in dust form, intermediate gas outlets can be used with success for the aforementioned purpose.

This feature of the invention does not merely allow the total gas yield to be subdivided into two or more fractions of different composition, but also affords the possibility of protecting the heavy hydrocarbon gases of the distillation from the long-continued action of the high temperature. By this means, the calorific value of the total gas produced is higher. In this case, it has been found preferable to heat the interior of the chamber between the dust inlet and the gas outlets to a lesser degree than the portions of the chamber situated thereafter, whereby in addition the thermal economy of the entire process is still further improved.

The prior withdrawal of rich gas is still further facilitated if interrupted transverse walls are provided in each case behind the various intermediate gas outlets of the gasifying chamber, which transverse walls prevent any undesired mixing of the different fractions of gas.

All the devices for carrying out the invention have in common the aforementioned features of the special size of the gasifying chamber and the arrangement of heating flues on its exterior. The principal dimension of the chamber may be horizontal, vertical or inclined. In the case of vertical or inclined chambers, the dust which is to be gasified is preferably introduced from above, and the steam required for gasification from below, so that both substances move in opposite directions, the steam upwardly and the dust downwardly. In this way, the dust is obstructed in its fall by the steam flowing in the opposite direction, and remains in suspension for a longer time, so that the duration of gasification is prolonged.

If the chamber is provided with a plurality of gas outlets for the purpose of separately withdrawing gases of different composition, it is preferable to construct the gas outlets in the form of narrow slits, lying with their long axis at right angles to the direction of flow in the chamber, so that therefore their dimension in this direction of flow is small. In this way, a gas which is always uniform is withdrawn at each outlet, because the gas which is produced varies in composition in the direction of flow of the dust, but always has a uniform quality in a definite cross section of the chamber. It is still more favourable, if the planes of the mouths of the gas withdrawal passages are at right angles to the direction of flow of the dust. In all cases, the said mouths are preferably protected by screens to prevent dust from entering. Mention has already been made of the preferable construction of transverse walls in the chamber, and the preferable offset arrangement of the steam inlet passages in assisting the intermediate withdrawal of gas.

Satisfactory utilization of the heat of the combustion gases leaving the heating flues for the purpose of pre-heating the combustion air, for super-heating the steam to be used, or for both purposes, is of great importance, for the economic success of the process. The heat exchange regenerators or recuperators required for this purpose, are preferably arranged near the oven in order to reduce, as far as possible, losses by conduction and radiation. It is particularly preferable, however, to construct the actual heating channels lying adjacent the gasification chamber as regenerators or recuperators.

In constructing the heating flues as regenerators, the said flues are naturally arranged in pairs, so that they may act alternately as heating flues, being thereby highly heated at the same time, and also after reversal has taken place, for preheating the combustion air or steam passed therethrough. The regenerator heating flues pertaining to one chamber may be divided parallel to the longitudinal axis of the chamber into two periodically reversed regenerators. The reduction in the radiation of heat consequent upon the compact arrangement of the oven portions effects such a considerable increase in the pre-heating that the occasional and partial deficiency in heating surface is amply compensated, which is manifest in an increased throughput of the oven.

It is still more preferable for the heating flues pertaining to one chamber to be divided at right angles to the longitudinal axis of the chamber into two or more periodically reversed regenerators. In this case, the maximum temperature desired for gasification prevails alternately on one side of the oven and on the other side. The fuel may then be supplied likewise alternately on different sides of the oven, so that the distillation or coking process, which as previously mentioned may be carried out at low temperatures, takes place each time on the cooler side of the oven. In this case, the device is best contrived in such a manner that openings for the supply of fuel and steam and for the withdrawal of the gas produced are provided at each end of the chamber, which are opened or closed separately, or still better together.

If the heating flues are constructed as recuperators, the total heating surface is always fully utilized. In this case also the lay-out of the oven is exceedingly compact on account of the reduction in the number of its parts consequent upon the double utilization of the heating flues, which considerably reduces the radiation of heat, especially since the cooler portions of the recuperators form at the same time an external heat screen.

If it is intended to use directly after gasification a purposely retained coked fuel residue for heating the chamber, this may be done by means of a suitable pulverized fuel firing.

More preferable, however, is the indirect combustion by means of a further gasification or auxiliary chamber placed before the heating flues, in which auxiliary chamber the fuel dust residue is partly or completely gasified by the addition of air or oxygen and, if required, steam also. This auxiliary chamber may also be combined with the gasification chamber proper in such a manner (for example, it may form an immediate extension of the same) that, by backward radiation, a partial heating of the gasification chamber takes place, which relieves the external heating of the said gasification chamber.

The auxiliary chamber is preferably also designed as an ash catcher. It may also be common to a plurality of gasification chambers, which also applies to the heating flues adjacent the auxiliary chamber.

Constructions according to the invention are shown diagrammatically by way of example in the accompanying drawings, in which—

Figure 2:
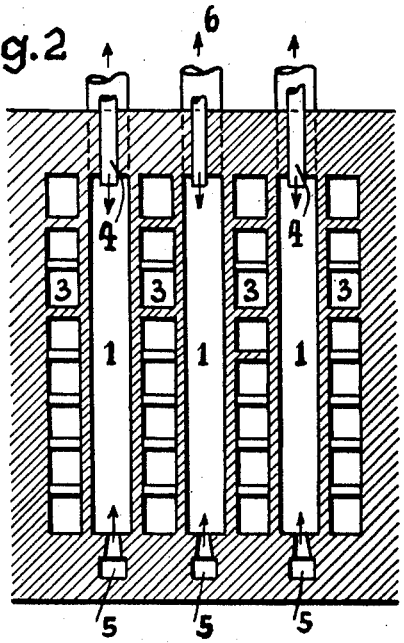
Figure 6:
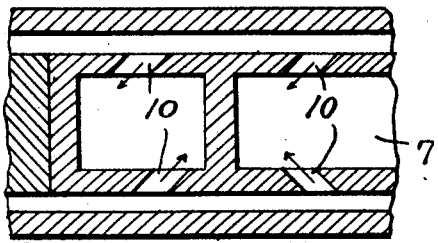
Figure 7:
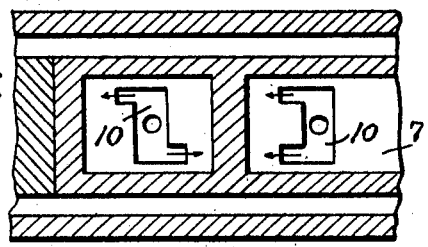
Figure 15:
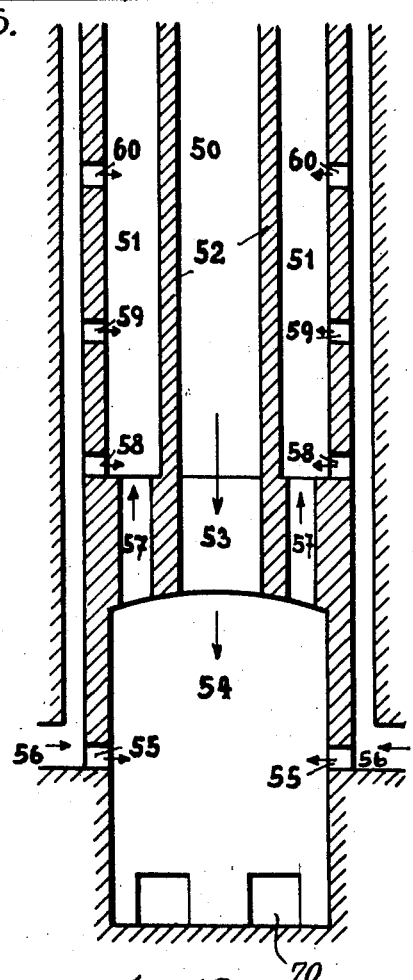
Figure 16:
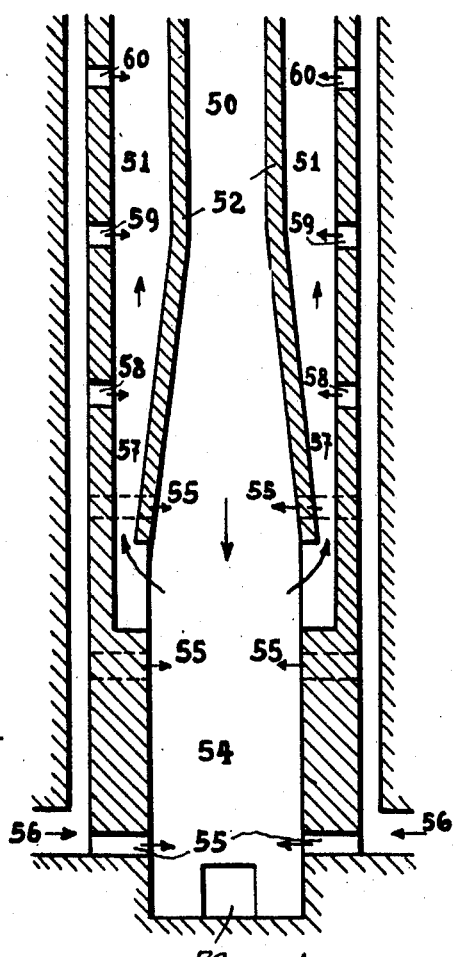
Figure 13:
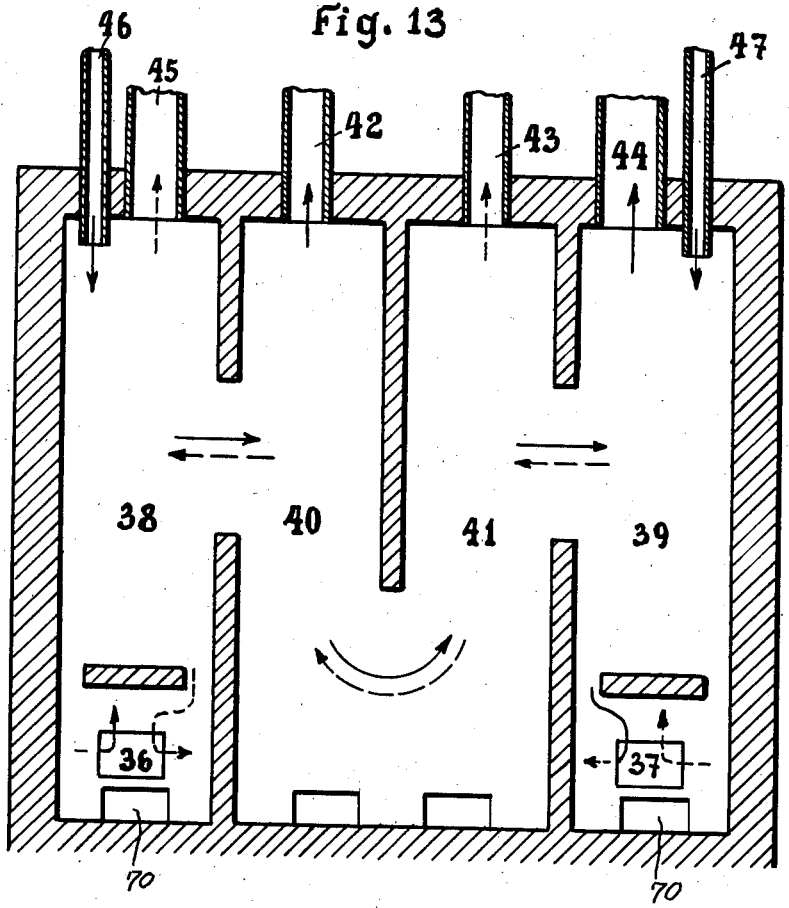
Figure 14:
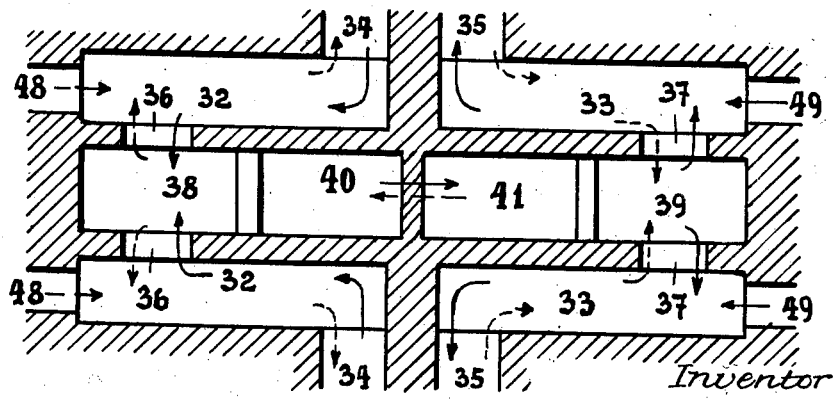

Figure 1 shows a vertical longitudinal section,

Figure 2 a vertical cross-section through a large chamber for the complete gasification of fuel dust;

Figure 3 is a vertical section through an oven heated by lean gas,

Figure 4 a vertical section through another construction of the oven shown in Figure 3, Figure 5 a vertical section through a horizontally extending large chamber having withdrawal of the rich gas and heating by lean gas, Figures 6 and 7 horizontal part sections through two different constructions of the steam inlets of the large chamber, Figure 8 a vertical section through a vertical large chamber having withdrawal of the rich gas, Figures 9 and 10 show respectively a vertical and a horizontal section through a vertical large chamber oven with recuperative heating flues, Figures 11 and 12 show respectively a vertical and a horizontal section through a vertical large chamber oven with regenerative heating flues, Figures 13 and 14 show respectively a vertical and a horizontal section through a horizontal large chamber oven with regenerative heating flues, Figures 15 and 16 show vertical sections through two constructional forms of vertical large chamber ovens with adjacent auxiliary chambers for the decomposition and combustion of the coke residues.

The gasification chambers 1 in Figures 1 and 2, which are similar in construction and size to the large horizontal coking chambers of the most modern colliery coking plants, i. e. at least 2×6×0.45 meters for vertical chambers or 6×4×0.45 meters for horizontal chambers, are heated externally to a temperature of 1,000 to 1,400° C. or more, according to the fuel which is to be gasified, by the combustion of any heating gas entering the heating flues 3 through the burners 2. The bituminous coal dust or brown coal dust or an atomized liquid fuel enters the chambers 1 through the inlet pipes 4 and is coked or distilled by the steam entering through the openings 5. The gas which is produced, a water gas or similar mixed gas, passes out of the chambers at 6.

The construction shown in Figures 3 and 4 have large chambers from which lean gas is withdrawn for the heating. Both have this in common, that the fuel is introduced from above and the withdrawal of the useful gas is likewise effected from above, that is to say, more or less near the fuel inlet, while the withdrawal of the heating gas is always effected from the lower portion of the chamber, and the combustion of the heating gas likewise mainly takes place in the neighbourhood of the lower portion of the chamber. The result of the last-mentioned fact is that the gasification chamber is more strongly heated below than in the upper portion, and also the fuel introduced from above becomes more strongly heated only by degrees as it gradually falls to the bottom of the gasification chamber. Thus, at the beginning of the gasification process, in the upper cooler portion of the gasification chamber there is first produced a mixture of methane and heavy hydro-carbons. On the contrary, in the lower and hotter portion of the chamber 7 there is produced a mixture of carbon monoxide and hydrogen, partly because there is a longer time available for the gasification of the fuel and a higher temperature is operative, and partly because the hydrocarbon mixture formed in the upper portion is further decomposed in the lower portion to carbon monoxide and hydrogen. The large chamber 7 in Figure 3 embodies in its simplest form the fundamental principle of the withdrawal of lean gas for the direct heating of the chamber. The chamber is heated externally to a high temperature by heating flues 8. The coal dust or the finely atomized liquid fuel is introduced from above through the pipe 9. The steam required for gasification enters the chamber at the bottom at 10, and inside mixes with the fuel cloud coming from above. Part of the gas which is produced is drawn out at 11 in the upper portion of the chamber, for the purpose of its subsequent purification and use.
The rest of the gas which is produced inside the chamber is drawn out through the lower openings 12 into the heating channels 8, where it is burnt with air admitted through the channels 13.
Figure 4 shows a special construction of a similar large chamber in the vicinity of the heating gas outlets 12. A special space is separated from the chamber by the walls 14. The connecting opening is preferably constricted by combining inclined or horizontal projections 15 with the partition walls 14, or by providing special plates 16 in, or in front of, the connecting opening, which projections or plates are built-in with the remaining portion of the chamber, i. e. the gasification chamber proper. This constriction is intended to provide an artificial resistance in front of the heating gas outlets 12 for the purpose of making it difficult for large quantities of gas to be carried off into the heating flues when the pressure in the heating flues and gas outlet pipe fluctuates, and for the purpose of facilitating the operation of the aforementioned accurate gas-pressure regulators.

The built-in portions 15 and 16 serving as the constriction are preferably arranged with their principal faces inclined or vertical, so that suspended dust can only lodge on them to a slight extent and can readily fall into the underlying chamber space.
Provision is made, as a further preferable contrivance, for the supply of small quantities of air or oxygen into the separated space in the vicinity of the heating gas outlets 12 through the channels 25. The oxygen introduced is intended to ensure the partial or complete gasification to carbon monoxide of the fuel residues which, in certain circumstances, may reach the vicinity of the outlets 12 insufficiently gasified. No appreciable combustion should take place within the chamber, and therefore the amount of air or oxygen supplied must be small.

Figure 5 shows a horizontally extending large chamber having withdrawal of rich gas, mixed gas and lean gas. The fuel enters the gasification chamber at the top on the left at 9, while the main gas outlet is provided at the top on the right at 11. The steam required for decomposition enters through one or more openings 10 in the lower portion of the chamber, in which are built the partition walls 17, 18, dividing the chamber into a plurality of compartments 19, 23, 24, etc., and compelling the fuel during its decomposition to take as long a path as possible in the chamber to the gas outlet 11. In addition, there is provided an intermediate gas outlet 20 which leads off separately the gas of greater calorific power produced in the first compartments of the chamber. The mixed gas flows out at 11.

The portion of the chamber which is situated in the vicinity of the heating gas outlets 12 is separated from the gasification chamber proper, as in the construction shown in Figure 4, by the wall 14 and by the built-in portions 15 and 16 which constrict the section of flow. In certain circumstances a small quantity of auxiliary air enters through an opening 25. The lean gas flows through the outlets 12 directly into the heating flues, where it is burnt in order to heat the chamber.

The steam supply openings 10 may be arranged in a variety of ways in the lateral walls or bottom or closures of the chamber and in the compartments 19 and (or 23 and) or 24.

Figures 6 and 7 show special constructional forms of such steam inlets. The steam jets issuing at 10 are either parallel and oppositely directed to one another and offset relatively to one another, thus bringing about an intense rotational movement of the steam in the chamber, or they are at right angles or at any other suitable angle to one another or to the lateral walls of the chamber, thus producing a strong eddy by the impact against the walls or against each other. By this means, an intimate contact with the heating surfaces of the chamber and a very thorough mixing with the cloud of fuel are obtained, and the steam is prevented from flowing too rapidly to the gas outlets, that is to say the escape of undecomposed steam and the attendant heat losses are avoided. The steam may be led both through the vertical walls of the chamber as shown in Figure 6 and through the bottom or the lower closures of the chamber by means of pipes as shown in Figure 7.

In order to obviate with greater certainty dust being carried along into the gas conduits, baffles 21, as shown in Figure 5, may be provided. They consist of refractory material and are arranged horizontally, vertically or at an inclination in front of the outlets in such a manner that the gas stream strikes them approximately vertically, and by the impact causes the dust still carried to be deposited. A plurality of baffles may also be arranged one behind the other, offset relatively to one another and parallel or at any angle to one another, such that the impact effect is repeated several times. For this purpose also the partition 17, situated in front of the first gas-collecting chamber 23, may be provided with an inclined, roof-shaped covering 22 over its passage opening, so as to deflect the large amounts of still ungasified fuel from the first gas outlet 20.

Figure 8 shows a vertical construction of a large chamber oven having means for withdrawing the rich gas. The solid fuel dust or atomized liquid fuel enters the chamber 61, which is heated externally by its own or other gas, through the inlet pipe 64, provided at the upper end, while the steam for decomposition is introduced in the lower end of the chamber at 66. The dust first falls through the upper portion 62 of the chamber, which is maintained at a relatively low temperature, and is there distilled or coked. The gas of high calorific value produced in 62 is led off at 67. The coked dust then falls into the highly heated chamber portion 63, where it is decomposed by the steam entering from the bottom to form water gas, which is withdrawn from the chamber at 65. For the purpose of heating the chamber, a portion of the water gas produced in 63 is led, in certain circumstances, through the openings 69 into the heating channels lying adjacent the chamber, where it is burnt with air.

In front of the gas outlets 65 and 67 there are arranged plates 68 of suitable material in such a position that their lower edges are situated at about the same height as the lower margins of the gas outlets, so that the dust is not carried along into the said outlets, and the gas is withdrawn in a plane at right angles to the direction of movement of the stream of dust. By this means the aforementioned advantage is obtained, namely, that the gas withdrawn has a definite, uniform quality. The withdrawal of the gas in a plane at right angles to the direction of the stream of dust may also be accomplished by means of the previously described construction of the gas outlets in the form of narrow slits, which are very low in the direction of the stream of dust. These slits extend round the entire periphery, or at least round a large portion of the periphery, of the chamber walls, in order that there will still be the requisite flow cross-section.

For the purpose of keeping the dust as far as possible in the chamber, the gas outlets 65 and 67 are prolonged upwardly, and are considerably increased in cross-section, so that the velocity of the gas in their upper portions is very small.

The three large chamber ovens shown in Figures 9 and 10, 11 and 12, 13 and 14 have this in common, the heating flues are designed to act at the same time as regenerators or recuperators for utilizing the heat of the escaping combustion gases.

The fuel dust which is to be gasified enters the chamber 7 (Figures 9 and 10), which is heated by the external heating flues 26, at the top through the pipe 27, and the steam required for decomposition enters through openings 28 provided in the bottom of one half of the chamber, while the gas, which is to be used as desired, is withdrawn at 11. A portion of the gas, which is produced in the chamber, is drawn off through the lower openings 29, which are provided in the other half of the chamber, into the heating flues 26, where it is burnt, with the aid of combustion air supplied through the channels 30. Adjacent the heating channels 26 are located on one half of the chamber the channels serving for superheating the steam, and on the other half of the chamber the channels serving for preheating the combustion air. The transmission of heat takes place uninterruptedly from the heating channels 26 through the intermediate walls 31.

In the large chamber oven shown in Figures 11 and 12, the heating channels are constructed as regenerators and are reversible. In the working phase shown by the full line arrows, the steam enters the heating channels 32 at 34, the said channels having been highly heated by the waste gases during the preceding period. The steam is thereby highly superheated and passes through the lower opening 36 into the chamber 7. A portion of the gas produced in the said chamber is drawn off through the lower opening 37 on the other side of the chamber, into the heating channels 33, where it is burnt with air entering at 49 in order to heat the adjacent chamber wall and the heating flue 33 together with the material filling it.

During the next working period the direction of flow is reversed, shown by the dotted arrows, so that the heating channels and walls lying on the other side of the chamber are heated.

The air for combustion is preferably preheated in a recuperative manner as in the constructional form shown in Figures 9 and 10.

The constructional form shown in Figures 13 and 14 consists of a chamber of great longitudinal dimension having regenerative heating flues. The openings for the supply of coal dust and for the discharge of gas are provided in duplicate, and may be opened or closed either separately or together. Regeneration is divided into two parts 32 and 33, not parallel to the horizontal principal axis of the chamber, as in the constructional form shown in Figures 11 and 12, but at right angles thereto, so that one half or the other of the chamber is heated alternately through both longitudinal sides. The arrangement of the checkers, and the heating gas conduit required for heating the various portions of the chamber walls in the heating channels 26 (Figs. 11 and 12), is not shown, so as to avoid complication of the drawings.

In the working phase shown by the full line arrows, the steam passes through the two openings 34 into the previously highly-heated regenerators or heating channels 32, where it is superheated, after which it passes through the two openings 36 into the chamber compartment 38, where it mixes with the coal dust introduced through the pipe 46. The cloud of steam, coal dust and gas thereby produced then passes through the further compartments 40, 41, and 39 of the chamber in such a manner as to ensure a good transference of heat from the side walls of the chamber to the cloud of dust. The main portion of the gas is withdrawn through the opening 44 for the purpose of purification and subsequent use, while the lean gas passes through the two openings 37 into the heating channels 33, where it is burnt with air entering at 49 and heats the built-in brick material and the right hand half of the chamber walls. Rich gas is withdrawn at 42. The coal inlet 47, the gas outlets 45 and 43 and the air inlets 48 are closed during this working period. During the next working period the flow takes place in the opposite direction and corresponds to the arrows shown in dotted lines.

Further constructional forms are obtained when the outlets and inlets for coal, gas, air and steam are otherwise arranged and only partly provided in duplicate. For example, the gas outlets 42 and 43 (Figure 13) may be combined. It is also possible to arrange the said gas outlets 20 (Fig. 5) at the ends of the chamber and a main gas outlet 11 in their middle.

Figures 15 and 16 show large gasification chambers in which, in contrast to the chambers described heretofore, the fuel dust is not gasified completely, but only to a coke dust residue, which is partly used directly and partly after decomposition in a special auxiliary chamber, for heating the oven flues and is thus likewise consumed.

Figure 15 shows the arrangement of a special decomposition chamber between the large chamber and its heating channels. The entirely enclosed chamber 50, in which the combustible dust is gasified together with steam in the known manner, is provided with the heat necessary for gasification from the heating channels 51 through the chamber walls 52. The gas remaining after withdrawal of the useful gas, together with a more or less large content of ungasified fuel dust passes through one or more channels 53 into the decomposition chamber 54, which may be given a section of such magnitude that the remaining dust ash settles to the bottom owing to the considerable reduction in the rate of flow and may be withdrawn by the openings 70'. Air or oxygen, and in certain circumstances steam also, are introduced into the decomposition chamber 54 through any number of openings 55 and in such quantities that the residual fuel dust still present is partly or completely gasified. In certain circumstances considerable heat, due to partial combustion, will be transferred backwardly directly by radiation to the fuel dust in suspension in the lower portion of the chamber 50. The residual gas and possibly also coke residues in the form of dust pass out of the decomposition chamber 54 through the channels 57 into the heating channels 51, where they are burnt in known manner with air entering through any number of openings 58, 59, etc., and thus heat the chamber 50 externally.

In the otherwise similar chamber shown in Figure 16, the lower portion of the gasification chamber 50 is constructed as a decomposition chamber 54 which is gradually widened. The ungasified fuel dust contained in the gas in the end of the chamber 50 is gasified in the portions 54 of the chamber, as in Figure 15, with addition of air, oxygen or steam from any number of openings 55 arranged in any way, and in certain circumstances is partly burnt. The heat thereby liberated is partly transferred directly by radiation to the last portion of the chamber 50, so that the necessary external heating is reduced. The residual gas, in certain circumstances mixed with a residuum of coke dust, flows through the channels 57 into the heating channels 51, where it is burnt in known manner with air from the openings 58, 59, etc., arranged in any manner.

The lower widening of the chamber is not absolutely necessary in the case of fuels which gasify readily. The lower portion of the gasification chamber may have the same section as the upper portion, and so serve also as decomposition chamber.

I claim:

1. A process of continuous gasification in an externally heated chamber the size of usual coke oven chambers which comprises injecting finely divided fuel into such a chamber, injecting steam into said chamber in a direction opposed to the flow of fuel therethrough thereby maintaining the fuel in suspension, and withdrawing rich gas from the upper part of the chamber and water gas and ash from the lower part of the chamber.

2. Process of continuous gasification in an externally heated chamber having a gasification zone of relatively large volume which comprises injecting finely divided fuel into such a chamber, injecting steam into said chamber in a direction opposed to the flow of fuel therethrough thereby maintaining the fuel in suspension, and withdrawing rich gas from the part of the chamber nearer the fuel inlet and leaner gas from the part nearer the steam inlet.

3. A process as in claim 2, the leaner gas so withdrawn being used, without substantial reduction in temperature, for heating said chamber externally.

4. Process of complete continuous gasification in an externally heated chamber having a gasification zone of relatively large volume, which comprises injecting finely divided fuel into such a chamber, injecting steam into said chamber in a direction opposed to the flow of fuel therethrough thereby maintaining the fuel in suspension, withdrawing rich gas from the part of the chamber nearer the fuel inlet and leaner gas from the part nearer the steam inlet, the leaner gas being used, without substantial reduction in temperature, for heating said chamber externally, and adding combustion-supporting gas to the leaner gas adjacent to the point of withdrawal of such leaner gas.

5. Process of continuous gasification in an externally heated chamber the size of usual coke oven chambers which comprises injecting finely divided fuel into such a chamber, injecting steam into said chamber in a direction opposed to the flow of fuel therethrough thereby maintaining the fuel in suspension, and withdrawing rich gas from the upper part of the chamber and water gas and residual matter from the lower part of the chamber.

6. Process of continuous gasification in an externally heated chamber the size of usual coke oven chambers which comprises injecting finely divided coal into such a chamber, injecting steam into said chamber in a direction opposed to the flow of fuel therethrough thereby maintaining the fuel in suspension, and withdrawing distillation gas from the upper part of the chamber and leaner gas and ash from the lower part of the chamber.

7. Process of continuous gasification in an externally heated chamber of the size of modern coke ovens, which comprises injecting finely divided fuel into the upper portion of such a chamber, injecting steam upward from the lower part of said chamber in a direction opposite to that of the flow of fuel in the chamber to thus maintain the fuel in suspension, heating the lower portion of the chamber to a higher degree than the upper portion, and withdrawing rich gas from the upper portion and leaner gas and residual matter from the lower portion.

8. Process of continuous gasification in an externally heated chamber of the size of modern coke ovens which comprises injecting finely divided coal into the upper portion of such a chamber, injecting steam upward from the lower part of said chamber in a direction opposite to the flow of fuel in the chamber to thus maintain the fuel in suspension, heating the lower part of the chamber to a higher degree than the upper part, and withdrawing distillation gas from the upper part and water gas and residual matter from the lower part.

9. Process of continuous gasification in an externally heated chamber having a gasification zone of relatively large volume which comprises injecting finely divided coal into such a chamber, injecting steam into said chamber in a direction opposed to the flow of fuel therethrough thereby maintaining the fuel in suspension, withdrawing distillation gas from the upper part of the chamber and leaner gas and residual fuel from the lower part, and passing the hot residual fuel directly to a second gasification zone to complete the gasification.

10. Process as in claim 9 with the added step of using the hot gas last produced immediately for heating the gasification chamber.

11. Process of continuous gasification in an externally heated chamber having a gasification zone of relatively large volume, which comprises spraying liquid fuel into said chamber, injecting steam into said chamber in a direction opposed to the flow of fuel therethrough thereby retarding the flow and agitating the fuel particles, withdrawing rich gas from the part of the chamber nearer the fuel inlet and leaner gas from the part nearer the steam inlet, the leaner gas being used, without substantial reduction in temperature, for heating said chamber externally, and adding combustion supporting gas to the leaner gas adjacent to the point of withdrawal of such leaner gas.

FRANZ HERZBERG.